Patented Apr. 6, 1954

2,674,605

UNITED STATES PATENT OFFICE 2,674,605

MANUFACTURE OF PREGNANES

Karl Miescher, Riehen, and Peter Wieland, Basel, Switzerland, assignors to Ciba Pharmaceutical Products, Inc., Summit, N. J.

No Drawing. Application June 26, 1950,
Serial No. 170,462

Claims priority, application Switzerland
July 15, 1949

10 Claims. (Cl. 260—397.3)

This invention provides a process for the manufacture of 20-keto-pregnanes from pregnanyl-(20)-alkyl-ketones having in the 17-position the side chain

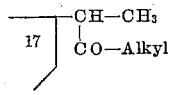

It is known that cyclic-aliphatic ketones can be oxidized by means of per-acids to the corresponding acyloxy - compounds. On the other hand, by the oxidation of dialkyl ketones with per-acids, there are obtained peroxides and no acyloxy-compounds. It would, therefore, be expected that pregnanyl-(20)-ketones, in which the keto group is in an aliphatic side chain, would yield peroxides by oxidation with per-acids.

According to the present invention, there can unexpectedly be obtained from pregnanyl-(20)-alkyl-ketones in excellent yield 20-acyloxy-pregnanes and from the latter by further oxidation 20-keto-pregnanes, by oxidizing the starting material, if desired with temporary protection of any double bonds present, with a per-acid, and, if desired, hydrolyzing the resulting 20-acyloxy-compound and further oxidizing the product to a 20-oxo-pregnane.

The present process is of great importance since it is the best method for producing 20-oxy-pregnanes and from the latter 20-keto-pregnanes by starting from compounds of the bisnor-cholanic acid series, and especially $\Delta^{5,6}$-3-oxy-bisnor - cholanic acid. The most productive known method, for example, starting from 3-acetoxy-$\Delta^{5,6}$-bisnor-cholanic acid and subjecting it to degradation by way of the azide gives a 32 per cent by weight yield of progesterone. On the other hand, by the process of the present invention the same starting material can easily be converted into progesterone with a total yield of about 50 per cent by weight.

The pregnanyl-(20)-alkyl-ketones, advantageously the -methyl-ketones, used as starting materials may contain in the steroid residue, especially in the 3-, 7-, 11- and/or 12-position, a free or substituted hydroxyl group such as an acyloxy group, for example, an acetoxy, propionoxy or benzoyloxy group, or in the 11-position a keto group, or in the steroid ring, for instance, in the 5.6 or 11.12-position, a carbon-to-carbon double bond.

The oxidation of the present invention is carried out by means of a per-acid, for instance, an aromatic per-acid, such as perbenzoic acid or monoperphthalic acid, and, for example, at about 0° C. Although it is of advantage to work in the presence of an acid catalyst, such as sulphuric acid, perchloric acid or para-toluene sulphonic acid, the oxidation may be carried out without such a catalyst. Thus, for example, when it is desired to oxidize the free hydroxyl group to a keto group in a 3-hydroxy-pregnanyl-(20)-ketone with simultaneous degradation of the side chain, the oxidation is conducted without the addition of a catalyst. It has been found that free hydroxyl groups can be oxidized to keto groups in the present process without the addition of acid. As a solvent there may be used an inert organic solvent, such as a halogenated hydrocarbon, especially chloroform, or ether. When the starting materials contain carbon-to-carbon double bonds, the latter are protected before the reaction with the per-acid. This is done with advantage by the addition of a halogen or a hydrogen halide, and especially by the addition of bromine. After the oxidation, the halogen-compounds are dehalogenated in known manner, for example, by treatment with zinc in glacial acetic acid. 20-acyloxy-pregnanes may be hydrolyzed to 20-hydroxy-pregnanes, and may be further oxidized. As oxidizing agents there may be used, for example, chromium trioxide, permanganates or metal alcoholates or phenolates together with ketones, such as aluminum isopropylate in the presence of cyclohexanone. In order to convert a 3,20-dihydroxy-$\Delta^{5,6}$-pregnene into a 3,20-dioxo-$\Delta^{4,5}$-pregnene it is of advantage first to oxidize, for example, with cyclohexanone in the presence of aluminum isopropylate, whereby the 3-hydroxy-$\Delta^{5,6}$-grouping is converted almost quantitatively into the 3-oxo-$\Delta^{4,5}$-grouping. Should the less reactive hydroxyl group in the 20-position not have been attacked or have been attacked only partially, it can be subsequently converted also into a keto group, for example, by means of chromic acid.

The products of the invention are useful as medicaments or as intermediate products for making medicaments.

The following examples illustrate the invention, the percentages and parts being by weight unless otherwise stated, and the relationship of parts by weight to parts by volume being the same as that of the gram to the cubic centimeter.

EXAMPLE 1

$\Delta^5$-pregnene-3β,20α-diol-diacetate

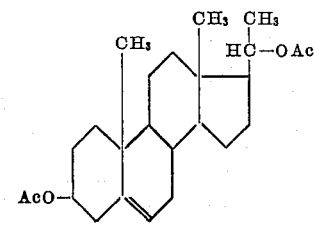

0.8 part of bromine, dissolved in 5.8 parts by volume of carbon tetrachloride, is added dropwise, while cooling with ice and agitating, to a solution of 1.93 parts of Δ⁵-3β-acetoxy-pregnenyl-(20)-methyl-ketone in 5 parts by volume of chloroform. After the solution is decolorized, it is evaporated under reduced pressure at room temperature. The residue is mixed, while cooling with ice, with 8.5 parts by volume of chloroform containing 1.5 parts of perbenzoic acid and then with 0.85 part by volume of a solution of 10 per cent. strength of sulphuric acid in glacial acetic acid. The reaction solution is allowed to stand, while the ice slowly melts, for 12 days at room temperature in the dark. It is then mixed with water and ether. The ethereal solution is washed once each with water, sodium bicarbonate solution and water, dried and evaporated under reduced pressure at room temperature. For the purpose of debromination the residue is dissolved in 40 parts by volume of glacial acetic acid, and 10 parts of zinc dust are added in portions in the course of one hour, while stirring (¾ hour at room temperature and ¼ hour at 50° C.). The whole is then heated to 75° C. in the course of ¼ hour. After the addition of water and ether, the ethereal solution is washed with water, dilute sodium carbonate solution and water, dried and evaporated. The residue is recrystallized from methanol to yield Δ⁵-pregnene-3β,20α-diol-diacetate melting at 142–143° C.

By the oxidation of Δ⁵-3β-hydroxy-pregnenyl-(20)-methyl-ketone with monoperphthalic acid and using para-toluene-sulphonic acid as catalyst, with intermediate protection of the double bond with bromine, there is obtained in a similar manner Δ⁵-pregnene-3β,20α-diol-20-monoacetate of the formula

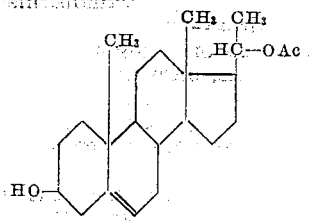

melting at 159.5–160.5° C.

The latter monoacetate is also obtained from Δ⁵-pregnene-3β,20α-diol-diacetate by boiling for 15 minutes a solution of 1 part of the diacetate and 0.1 part of potassium carbonate in 30 parts by volume of methanol and 2 parts by volume of water.

0.6 part of the monoacetate and 0.45 part of aluminum isopropylate in 54 parts by volume of toluene and 9 parts by volume of cyclohexanone are boiled for 40 minutes in a current of nitrogen under reflux. There is obtained Δ⁴-3-keto-pregnene-20α-ol-acetate of the formula

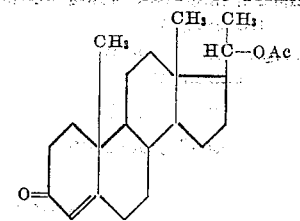

melting at 137.5–138.5° C.

By oxidizing 3β-hydroxy-pregnanyl-(20)-methyl-ketone in an analogous manner with perbenzoic acid in the presence of sulfuric acid, pregnane-3β,20β-diol-20-monoacetate of melting point 169–170° C. is formed.

EXAMPLE 2

Progesterone

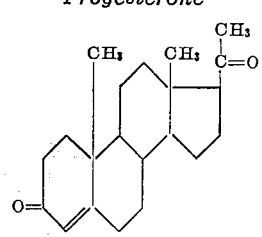

1.46 parts of the diacetate obtained as described in Example 1 are boiled under reflux with 60 parts by volume of a solution of 5 per cent. strength of caustic potash in methyl alcohol for one hour in a current of nitrogen. After the addition of ether and water, the ethereal solution is washed with water, dried and evaporated. By recrystallizing the residue from methanol, there is obtained Δ⁵-pregnene-3β,20α-diol of the formula

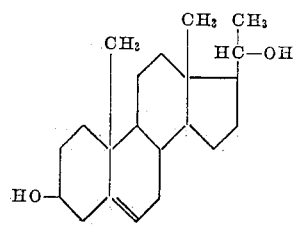

melting at 177–178° C. The mother liquor is united with the residue from the evaporation of the mother liquor of the diacetate from Example 1, which has been hydrolyzed in the same manner with 20 parts by volume of a solution of 5 per cent. strength of caustic potash in methyl alcohol. By chromatography over aluminum oxide, further quantities of the diol are obtained.

2 parts by volume of solvent are distilled off from a solution of 0.2 part of Δ⁵-pregnene-3β,20α-diol in 15 parts by volume of toluene and 3 parts by volume of cyclohexanone. At intervals of 5 minutes, 3 additions of 0.05 part of aluminum isopropylate dissolved in 1 part by volume of toluene are made. During the period of these additions, a further 1 part by volume of solvent is distilled off. Then the whole is heated at the boil for one hour in a current of nitrogen, another 1.5 parts by volume distilling over. After the addition of water and ether, the ethereal solution is washed with dilute hydrochloric acid and water, dried and evaporated. In order to remove toluene and cyclohexanone, the residue is subjected to steam distillation. The product is then sublimed at 120° C. in a high vacuum, and chromatographed over 6 parts of aluminum oxide. From the benzene-petroleum ether elutriates, there is obtained progesterone melting at 125–126° C. after recrystallization from a mixture of ether and petroleum ether.

The benzene and benzene-ether elutriates contain Δ⁴-3-keto-pregnene-20α-ol of the formula

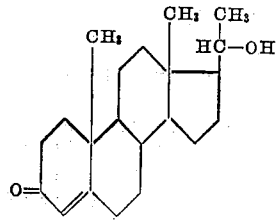

which melts at 161–163° C.

The latter product can also be obtained by boiling for 25 minutes a solution of 0.14 part of Δ⁴-3-keto-pregnene-20α-ol-acetate and 0.07 part of potassium hydroxide in 4.2 parts by volume of methanol.

For conversion into progesterone all the fractions containing the keto-alcohol (0.07 part) are united and dissolved in 1 part by volume of carbon tetrachloride and 2 parts by volume of glacial acetic acid of 95 per cent. strength. A solution of 0.03 part of chromic acid in 1 part by volume of glacial acetic acid of 95 per cent. strength is then added while cooling with ice. The whole is allowed to stand first for 15 minutes in ice-water and then for one hour at room temperature. After the addition of an aqueous solution of sodium sulphite, the whole is mixed with water and ether. The ethereal solution is washed, dried and evaporated, and the residue is united with the mother liquor remaining from the recovery of the progesterone described above. The mixture is then dissolved in 50 parts by volume of benzene free from thiophene and extracted by agitating 12 times with 5 parts by volume of sulphuric acid of 50 per cent. strength by volume. The sulphuric acid extracts are immediately diluted with water to ten times their volume, and extracted by agitation with ether. The ethereal solution is washed, dried and evaporated, and the oil which remains behind is distilled under a high vacuum at 120° C. The distillate is recrystallized from a mixture of ether and petroleum ether, whereby further progesterone melting at 125–126° C. is obtained.

0.5 part of Δ⁵-pregnene-3β,20α-diol is boiled for 2 hours with 10 parts by volume of glacial acetic acid in a current of nitrogen. Δ⁵-pregnene-3β,20α-diol-3-monoacetate of the formula

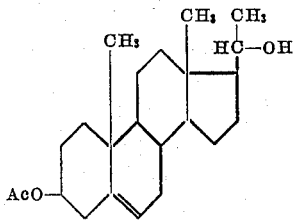

is obtained, which melts at 137.5–138.5° C. The latter compound, after protection of the double bond with bromide, is oxidized with chromic acid and debrominated with zinc in glacial acetic acid to convert it into Δ⁵-pregnene-3β-ol-20-one acetate of the formula

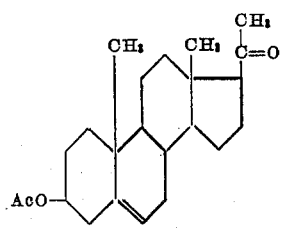

It melts at 145–145.5° C.

EXAMPLE 3

Δ⁵-pregnene-3β,20β-diol-20-monoacetate

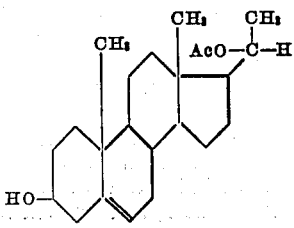

The dibromide of 1.93 parts of Δ⁵-3β-acetoxy-iso-pregnenyl-(20)-methyl ketone is oxidized in the same manner as is described above for preparing Δ⁵-pregnene-3β,20α-diol-diacetate. After debromination with 6 parts of zinc and 20 parts by volume of glacial acetic acid, the product is hydrolyzed by boiling it for one hour with 50 parts by volume of methanol, 5 parts by volume of water and 1.5 parts of potassium carbonate. By recrystallizing the reaction product from methanol, there is obtained Δ⁵-pregnene-3β,20β-diol-20-monoacetate melting at 179–180° C.

The above monoacetate can also be obtained from Δ⁵-3β-hydroxy-iso-pregnenyl-(20)-methyl ketone by oxidation with monoperphthalic acid and para-toluene sulphonic acid with intermediate protection of the double bond with bromine.

0.15 part of the monoacetate, 1 part by volume of pyridine and 0.75 part by volume of acetic anhydride are allowed to stand at room temperature for 4 hours. Δ⁵-pregnene-3β,20β-diol diacetate, melting at 125–126° C. and having the formula

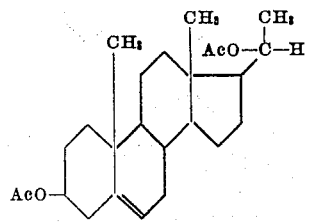

is obtained.

By boiling a solution of 0.12 part of the monoacetate with 0.09 part of aluminum isopropylate in 12 parts by volume of toluene and 2 parts by volume of cyclohexanone for 30 minutes, there is obtained Δ⁴-3-keto-pregnene-20β-ol acetate of the formula

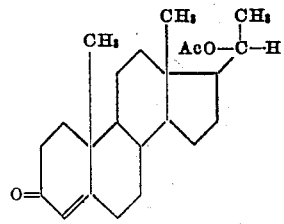

melting at 159–159.5° C. By boiling 0.06 part of the latter acetoxy-ketone with 0.03 part of potassium hydroxide in 1.8 parts by volume of methanol for ½ hour, there is obtained Δ⁴-3-keto-pregnene-20β-ol of the formula

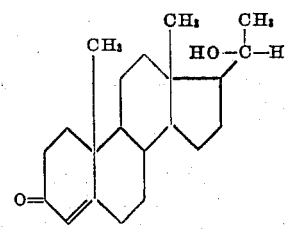

melting at 171–172° C.

The latter ketol can also be obtained by first converting 0.2 part of Δ⁵-pregnene-3β,20β-diol-20-monoacetate or the corresponding diacetate by boiling with 0.6 part of caustic potash solution in 12 parts by volume of methanol, into Δ⁵-pregnene-3β,20β-diol of the formula

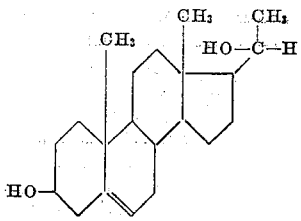

melting at 200.5–201.5° C., and then partially oxidizing the latter in the 3-position with aluminum isopropylate and cyclohexanone.

By boiling 0.25 part of Δ⁵-pregnene-3β,20β-diol with 10 parts by volume of glacial acetic acid for 2 hours in a current of nitrogen under reflux there is obtained Δ⁵-pregnene-3β,20β-diol-3-monoacetate of the formula

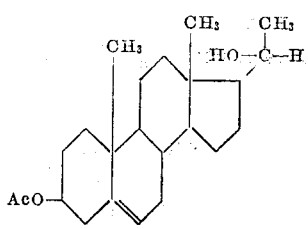

melting at 164.5–165.5° C. The latter compound, after intermediate protection of the double bond with bromine, is converted by oxidation with chromic acid into Δ⁵-pregnene-3β-ol-20-one acetate.

EXAMPLE 4

*Progesterone*

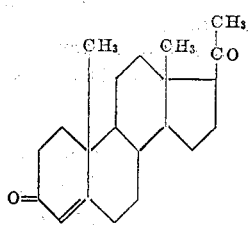

0.055 part of bromine, dissolved in 0.35 part by volume of carbon tetrachloride, is added to a solution, cooled with ice, of 0.11 part of Δ⁵-pregnene-3β,20β-diol in 3 parts by volume of chloroform and 6 parts by volume of glacial acetic acid of 95 per cent. strength. Then 0.08 part of chromic acid in 3 parts by volume of glacial acetic acid of 95 per cent. strength is added while cooling with ice. The solution is allowed to stand at room temperature for ½ hour. It is then cooled with ice-water and mixed with an aqueous solution of sodium sulphite. After the addition of ether and water, the ethereal solution is washed with a dilute sodium carbonate solution and water, dried and evaporated under reduced pressure at 35° C. For the purpose of debromination, the residue is dissolved in 10 parts by volume of glacial acetic acid and heated up to 50° C. in the course of ¼ hour with the addition of 1 part of zinc dust. The whole is then heated up to 75° C. in the course of a further ¼ hour. After the addition of water and ether, the ethereal solution is washed with dilute sodium carbonate solution and water, dried, and evaporated. The residue is chromatographed over 6 parts of aluminum oxide. The fractions elutriated with a mixture of petroleum ether and benzene (2:1) contain progesterone, which melts at 125–126° C. after recrystallization from isopropyl ether.

0.04 part of Δ⁴-3-keto-pregnene-20β-ol is dissolved in 1 part by volume of carbon tetrachloride and 2 parts by volume of glacial acetic acid of 95 per cent. strength. 0.02 part of chromium trioxide in 1 part by volume of glacial acetic acid of 95 per cent. strength is then added while cooling with ice. The solution is allowed to stand in ice-water for 15 minutes and for 1 hour at 15° C. After the addition of an aqueous solution of sodium sulphite, the whole is mixed with water and ether. The ethereal solution is washed with water, dilute sodium carbonate solution and water, the solution is evaporated, and the residue is distilled under a high vacuum at 110–120° C. By recrystallizing the distillate from a mixture of ether and petroleum ether, progesterone is obtained.

Having thus disclosed the invention, what is claimed is:

1. A process for the preparation of a pregnane, which comprises subjecting a pregnanyl-(20)-lower alkyl-ketone to the action of a per-acid selected from the group consisting of perbenzoic acid and monoperphthalic acid, and separating the resulting corresponding 20-acyloxy compound.

2. A process for the preparation of a pregnane, which comprises subjecting a nuclearly-saturated pregnanyl-(20)-lower alkyl-ketone to the action of a per-acid selected from the group consisting of perbenzoic acid and monoperphthalic acid, and separating the resulting corresponding 20-acyloxy compound.

3. A process for the preparation of a pregnane, which comprises subjecting a Δ⁵-3-acyloxy-pregnenyl-(20)-lower-alkyl-ketone to the action of a per-acid selected from the group consisting of perbenzoic acid and monoperphthalic acid, with intermediate protection of the double bond, and separating the resulting corresponding 20-acyloxy compound.

4. A process for the preparation of progesterone, which comprises subjecting 3-acetoxy-Δ⁵-pregnenyl-(20)-methyl-ketone dibromide to the action of perbenzoic acid whereby the Δ⁵-pregnene-3,20-diol-diacetate dibromide is produced, treating the latter with a debrominating agent to produce the Δ⁵-pregnene-3,20-diol-diacetate, then treating the last-named compound with a saponifying agent to produce the Δ⁵-pregnene-3,20-diol, subjecting the latter to oxidation by means of aluminum isopropylate in presence of a ketone, and then treating the resultant product, wherein the 20-hydroxy group is still partly unattacked, with chromic acid whereby the 20-hydroxy group is converted into the 20-keto group.

5. A process for the preparation of a pregnane, which comprises subjecting a pregnanyl-(20)-lower alkyl-ketone to the action of perbenzoic acid, and separating the resulting 20-acyloxy pregnane compound.

6. A process for the preparation of a pregnane, which comprises subjecting a nuclearly saturated pregnanyl-(20)-lower alkyl ketone to the action of perbenzoic acid.

7. A process for the preparation of a pregnane, which comprises subjecting a Δ⁵-3-acyloxy-pregnenyl-(20)-lower alkyl ketone to the action of perbenzoic acid with intermediate protection of the double bond.

8. A process for the preparation of progesterone, which comprises subjecting 3-acetoxy-Δ⁵-pregnenyl-20-methyl ketone dibromide to the action of perbenzoic acid, whereby the Δ⁵-pregnene- 3,20-diol-diacetate dibromide is produced, treating the latter with a debrominating agent to produce the Δ⁵-pregnene-3,20-diol-diacetate, then treating the last named compound with a saponifying agent to produce the Δ⁵-pregnene-3,20-diol, and subjecting the latter to oxidation by means of aluminum isopropylate in the presence of a ketone whereby progesterone is formed.

9. A process for the preparation of a pregnane, which comprises subjecting a pregnanyl-(20)-methyl ketone to the action of perbenzoic acid.

10. A process for the preparation of a pregnane, which comprises subjecting a compound selected from the class consisting of 3-hydroxy-pregnanyl-(20)-lower alkyl ketones and their 3-acyloxy derivatives to the action of perbenzoic acid.

References Cited in the file of this patent

UNITED STATES PATENTS

| Number | Name | Date |
|---|---|---|
| 2,304,836 | Marker | Dec. 15, 1942 |
| 2,341,557 | Julian | Feb. 15, 1944 |

OTHER REFERENCES

Sarett: Jour. Am. Chem. Soc. 69, 2899–2901 (1947).